United States Patent
Rettig

[15] 3,636,373
[45] Jan. 18, 1972

[54] LIMIT DEFINING FIRING WAVE GENERATOR

[72] Inventor: Charles E. Rettig, Brookfield, Wis.
[73] Assignee: The Louis Allis Company
[22] Filed: Sept. 2, 1969
[21] Appl. No.: 854,429

[52] U.S. Cl. ............... 307/252 P, 307/261, 307/262, 307/305, 307/318
[51] Int. Cl. ............... H03k 1/12, H03k 17/00
[58] Field of Search ............... 307/252.70–252.74, 307/260, 261, 262, 305, 318

[56] References Cited

UNITED STATES PATENTS

| | | | |
|---|---|---|---|
| 2,999,948 | 9/1961 | Beckwith | 307/262 |
| 3,369,150 | 2/1968 | Malmin | 307/262 |
| 3,386,037 | 5/1968 | Yamada | 307/262 |
| 3,475,624 | 10/1969 | Thompson | 307/252 |
| 3,492,502 | 1/1970 | Chang | 307/262 |

Primary Examiner—Donald D. Forrer
Assistant Examiner—David M. Carter
Attorney—Alfred B. Levine, Alan C. Rose and Daniel D. Fetterly

[57] ABSTRACT

A firing wave generator for a phase controlled rectifier which generates a square wave in addition to a cosine wave. The square wave is added to the cosine wave to provide a firing wave with the end points defined by the sides of the square wave to insure coincidence of the firing wave with the direct voltage command of the phase controlled rectifier.

9 Claims, 4 Drawing Figures

LIMIT DEFINING FIRING WAVE GENERATOR

Field of the Invention

This invention relates to firing wave generators for phase controlled rectifiers. More particularly, it relates to a firing wave generator in which the limit function as well as the firing wave is generated as a composite firing wave.

Background of the Invention

In a phase controlled rectifier in which firing of the thyristors is controlled by the point at which a firing wave or rider voltage derived from the alternating voltage to be rectified coincides with a direct voltage command, the direct voltage command can exceed the firing wave and avoid the necessary coincidence. Such a situation is prevalent when the thyristor is to be fired at the earliest possible time. Here the DC level must coincide with the leading end of the cosine firing wave. Because the cosine firing wave is nearly horizontal at its leading end, there is a very small margin between coincidence of the DC level with the firing wave and no coincidence where the DC level slightly exceeds the extent of the firing wave. Since full conduction has been called for and a lack of coincidence between the firing wave and the command voltage results in no firing pulse being generated, the results can be disastrous. Accordingly, it has been recognized that there is a need to define and extend the end points of the firing wave to ensure coincidence.

Many solutions for solving the problem of misfiring when full on firing is desired are described in the prior art. Generally, a limit function as well as a firing wave is generated and both waves compared with the DC level so that intersection between the DC level and either or the waves will result in a firing pulse being applied to the thyristor. While many of these solutions have provided an answer to the problem, the circuitry required has been both expensive and extensive. Either two waves are generated by duplicative circuitry or transformers and other expensive elements have been employed to fabricate a single composite wave.

It is accordingly an object of the present invention to provide a simple and inexpensive firing wave generator in which the limits of the firing wave are defined.

Another object of the present invention is to provide a firing wave generator in which a combined firing wave and limit wave is generated.

Summary of the Invention

In general, these and other objects and features of the invention are provided by a firing wave generator for a phase controlled rectifier which generates both a cosine firing wave and a square wave limit function which are combined as a single firing wave having its end points defined by the sides of the square wave to ensure coincidence of the firing wave with the direct voltage command. The two waves are generated by a phase shift circuit and limit circuit, respectively. The limit circuit may simply consist of a Zener diode clipping circuit supplied by a current common to the phase shift circuit and derived from the alternating voltage to be rectified.

Brief Description of the Drawings

The objects and features of the invention can be better understood with reference to the detailed description of the preferred embodiment shown in the drawings, in which.

Detailed Description

Figure 1:
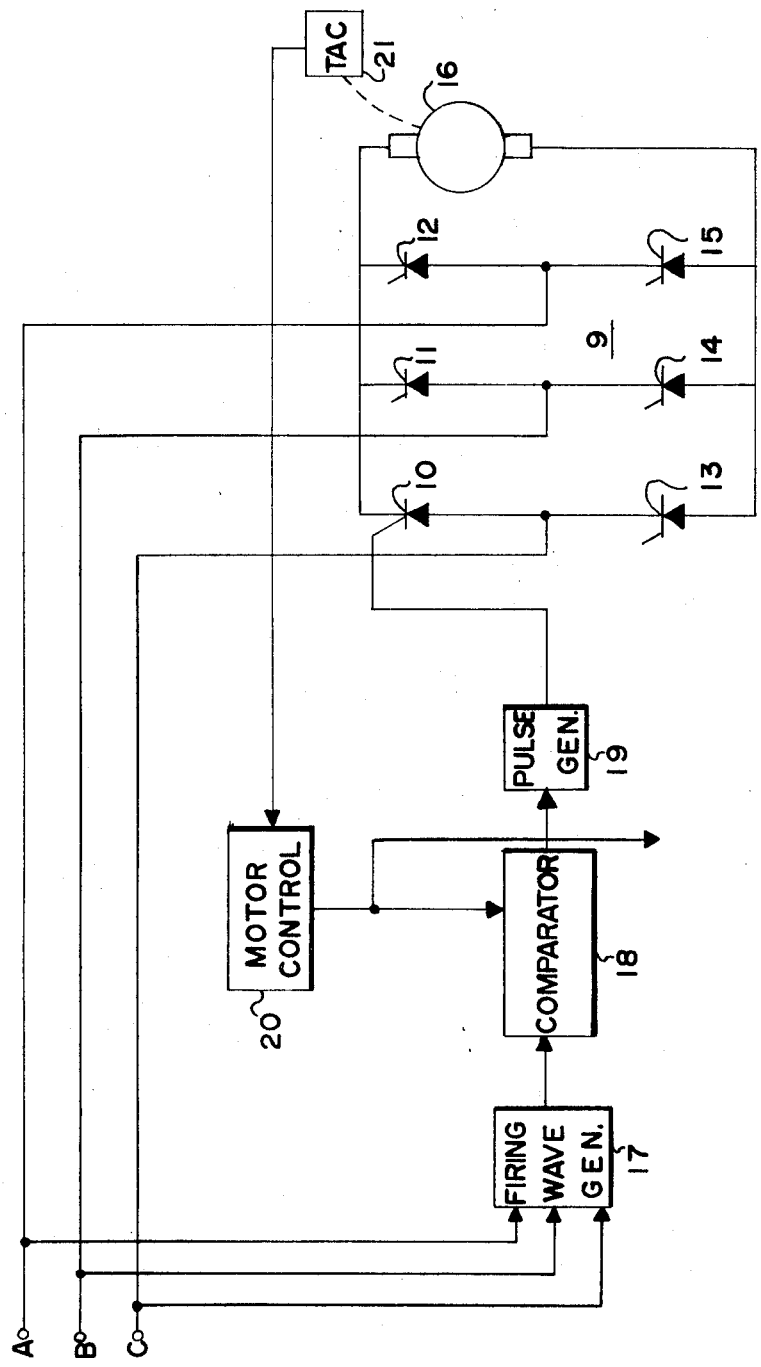
FIG. 1 is a schematic and block diagram of a phase controlled rectifier system in which the firing circuit of the present invention may be employed.

In FIG 1 there is shown a phase controlled rectifier used to drive a DC motor. Phase controlled rectifier 9 employs six thyristors (silicon controlled rectifiers, hereafter SCR's) 10–15 to supply six-phase rectified line-to-line voltage to the motor armature 16. This typical phase controlled rectifier is controlled by a DC plus AC firing circuit of which one phase of the duplicative circuitry for each SCR is shown to include a firing wave generator 17 connected to the alternating voltage source to be rectified. The firing wave generated from the alternating voltage is compared with a DC command which is the voltage difference between an actual motor parameter, such as a voltage indicative of motor speed, and the desired value of that parameter developed in the motor control circuit 20 by a reference or command voltage generator not shown. When there is a coincidence of the firing wave and the DC command, comparator 18 produces an output to pulse generator 19 which develops the firing pulse for SCR10.

Figure 3:
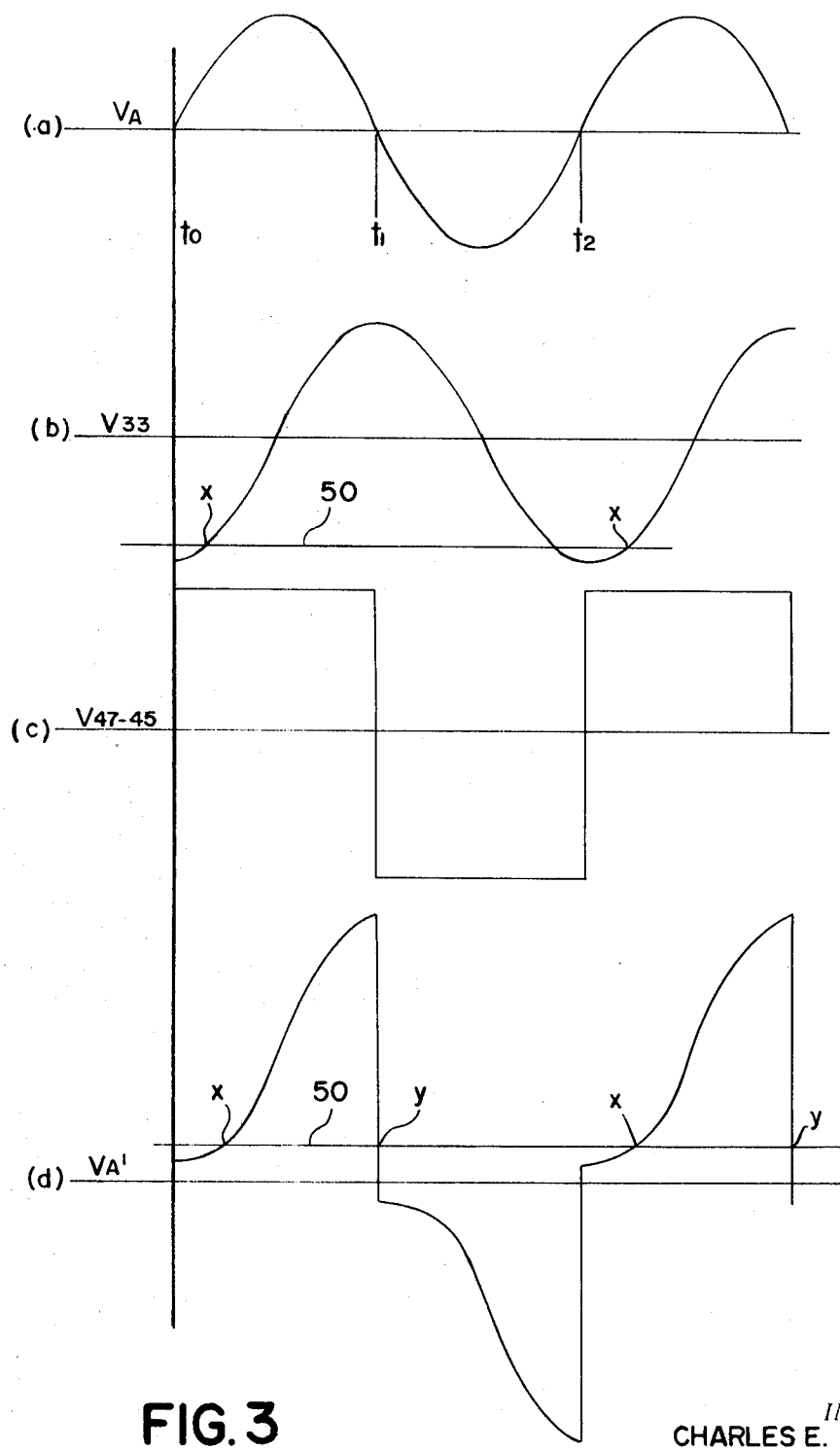
FIG. 3 illustrates wave shapes useful in understanding the present invention.

FIG. 3b shows one cycle of the typical cosine firing wave. The portion of the firing wave utilized is the negative to positive half cycle from time $t_0$ to $t_1$. The phase of this firing wave relative to the alternating voltage to be rectified is such that the firing wave affords control from a state of maximum rectifying to a state of maximum inverting. If there is a coincidence between the DC command of the phase controlled rectifier shown as a horizontal line 50 and this firing wave at time $t_0$, the SCR will be fired at the earliest possible point and maximum conduction will result. However, as can be noted from FIG. 3b, the cosine wave is very nearly horizontal at time $t_0$ and therefore a DC level which is very slightly below the firing wave at this point will not intersect and no firing pulse will be produced. It is therefore desirable to enunciate the $t_0$ end point of the firing wave so that there will still be coincidence with the DC command even when the command extends beyond the normal range of the firing wave.

In FIG. 1 comparator 18 preferably is a differential amplifier responsive to the DC command at one input and the firing wave at the other input. Since a differential amplifier changes the state of its output when the polarity of the difference between the two input voltages changes, coincidence, as this term is used in the description, marks that point at which the polarity of the difference changes. The pulse generator 19 is only responsive to the one of the two outputs of the comparator indicating coincidence of the DC command with the negative to positive portion of the firing wave, as shown at point "$x$" in FIG. 3d, and not the intersection between the positively to negatively marked trailing end point of the firing wave and the DC command, as shown at point "$y$."

Figure 2:
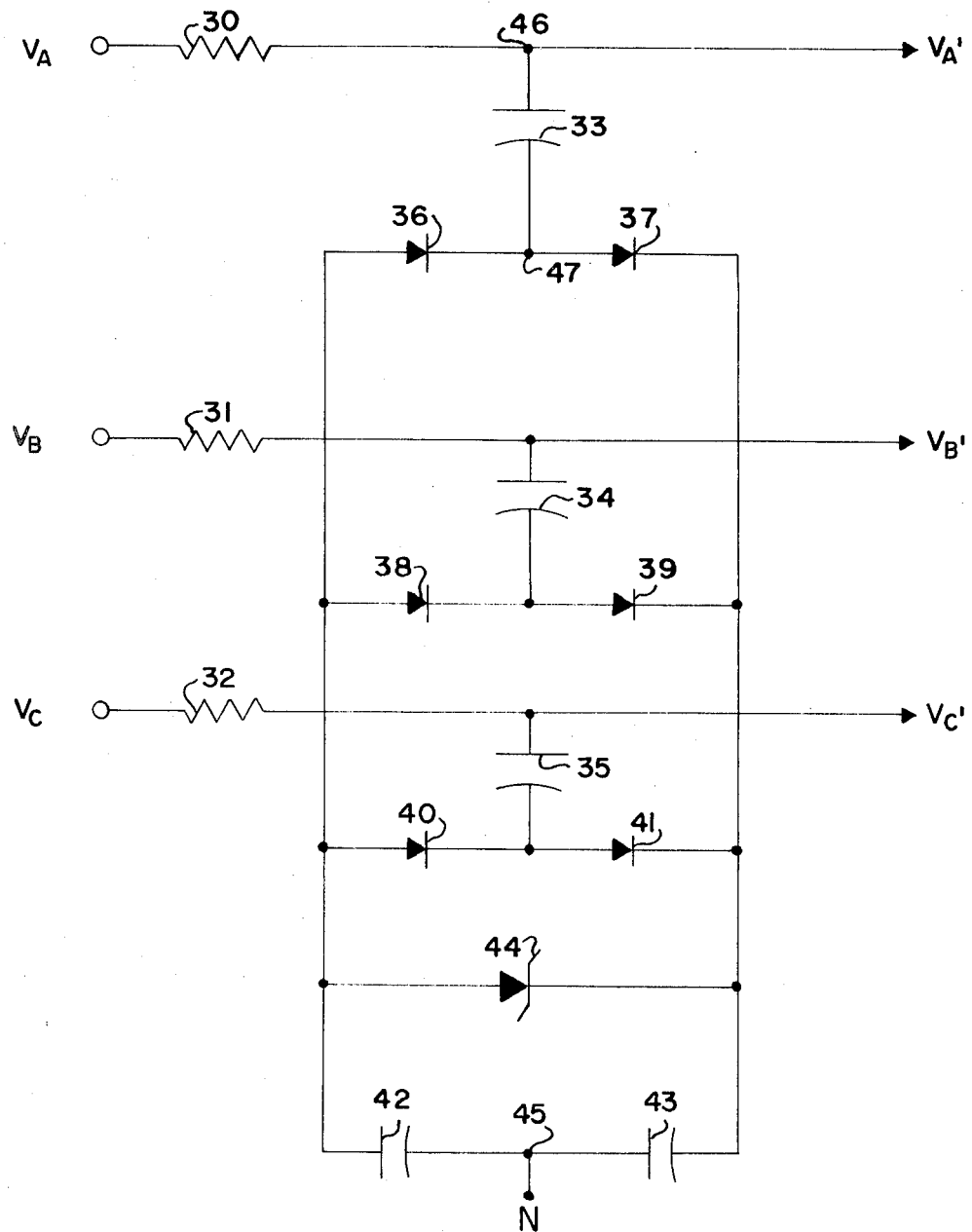
FIG. 2 is a schematic diagram of a firing wave generator in accordance with the present invention.

In FIG. 2 there is shown a firing wave-limit wave generating circuit in accordance with the objects of the present invention. The circuit shown in this figure would be employed as the firing wave generator 17 for the phase controlled rectifier shown in FIG. 1.

The circuit is shown with the three phase to neutral voltages $V_A$, $V_B$ and $V_C$ being applied thereto. FIG. 3a shows one of these voltages, $V_A$, as it appears at resistor 30. The output voltage $V_A'$ is shown in FIG. 3d. The waveform $V_A'$ comprises two firing waves. One wave appears from time $t_0$ to $t_1$ and is suitable for firing SCR10 of SCR's 10, 11 or 12. The other wave appears from time $t_1$ to $t_2$ and when inverted, for example by a transformer (not shown), is appropriate for firing SCR13 of SCR's 13, 14 and 15.

The firing wave generator shown in FIG. 2 is made up of three basic portions, a phase shift circuit for each phase comprising a resistor, such as resistor 30, and a capacitor, such as capacitor 33. The second portion is made up of a current steering circuit such as diodes 36 and 37. The third portion is a DC voltage generator common to the three phases made up of Zener diode 44 and capacitors 42 and 43. The first portion of the circuit is old. The resistor-capacitor combination to provide a sinusoidal voltage phase shifted 90° from the voltage to be rectified by the corresponding thyristor is normally found as the firing wave generator in a phase controlled rectifier. The cosine voltage appearing across capacitor 33 is shown by FIG. 3b.

Resistor 30 and its counterparts 31 and 32 are selected to be of large value to develop a current proportional to the voltage $V_A$. This current passes through capacitor 33 to produce a voltage $V_{33}$ as shown at (b) in FIG. 3 and also through either or diodes 36 or 37 depending upon the polarity of the current. The current, when of positive polarity, passes down the right hand side of the circuit to capacitor 43 which it charges until Zener diode 44 breaks down. At this point, both capacitor 43 and 42 continue to conduct the current to the electrical common 45. During negative half cycles of $V_A$ the current travels from the electrical common 45 through capacitors 42 and 43, up the left-hand side of the circuit and through diode 36. The Zener diode thus clips the voltage developed across capacitors 42 and 43 to form the magnitude of the square wave output shown at (c) in FIG. 3. Capacitors 43 and 42 connected across the Zener diode provide both a filtering function eliminating harmonic voltages, and a dividing function dividing the Zener breakdown voltage between the two polarities to provide a symmetrical square wave.

The voltage output from the firing wave circuit appears between points 45 and 46 and as such as the sum of the sinusoidal wave appearing across capacitor 33 and the square wave made up of the consecutive applications of the voltage on capacitors 42 and 43 to point 47. This composite wave form is shown in FIG. 3d.

FIG. 3d shows the effect of adding the square wave in FIG. 3c to the sinusoidal wave shown at 3b. It is noted that the end points of the firing wave are defined by the sides of the square wave voltage so that coincidence with the direct voltage command is ensured even though the command voltage might fall below the normal beginning end point of the firing wave. In addition, the firing wave is raised above the zero voltage level so that the output coincidence points always are of one polarity. This is an added advantage of the invention and not an essential element thereof. The level of raising the sinusoidal wave is determined by the breakdown voltage value of the Zener diode 44.

It is noted that the circuitry for the $V_B$ and $V_C$ phase to neutral voltages shown in FIG. 2 are identical to that shown for the $V_A$ voltage already described.

Figure 4:
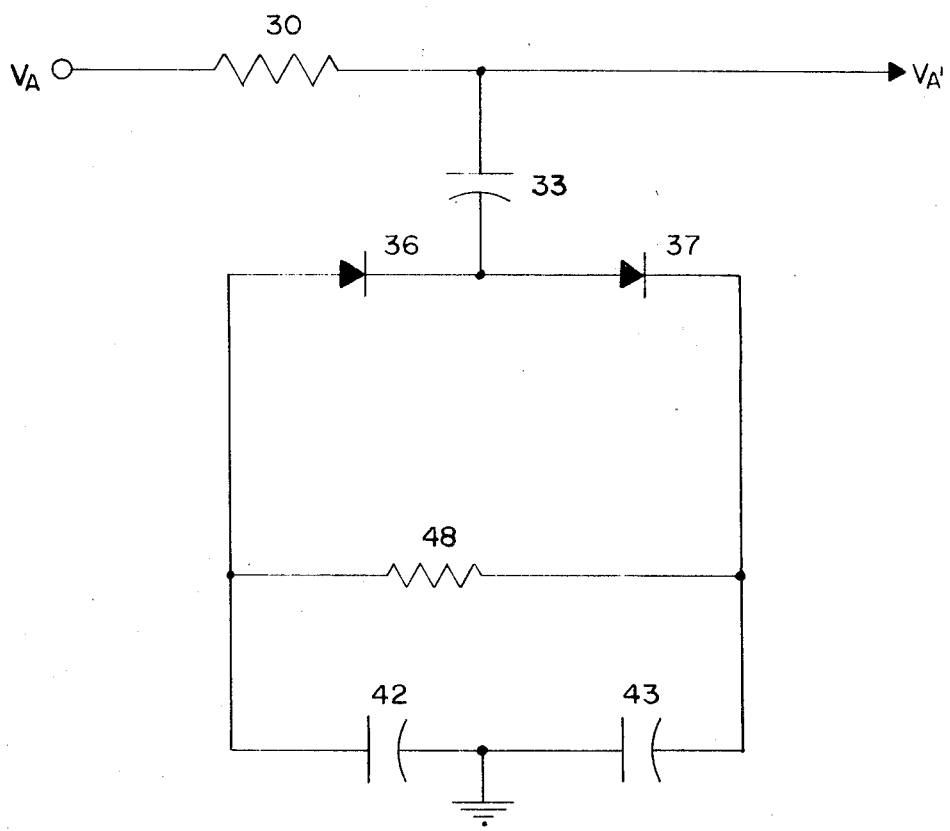
FIG. 4 is a schematic diagram of an alternative embodiment of the invention.

Another embodiment of the invention is shown in FIG. 4. Although only a single phase portion of the circuit of FIG. 2 is reproduced here, the only significant change between FIGS 2 and 4 is the replacement of Zener diode 44 with resistor 48. The circuit functions substantially as that of FIG. 2. Instead of clipping at a fixed level, as achieved by the Zener diode, the current through resistor 48 is the average of the rectified current from resistor 30. The square wave output is realized by the switching of the different polarity capacitor 42, 43 voltage from diode 37 to diode 36 as described before.

Because the level of the square wave generated by the circuit shown in FIG. 4 is not dependent upon a fixed breakdown level, the firing wave level will change with the amplitude of the input line voltage, a desirable feature. The circuit shown in FIG. 2 would be preferred, however, where high speed of response is required. The speed of response of the circuit shown in FIG. 4 is limited to the time constant between resistor 48 and capacitors 42 and 43.

Several changes can be made to depart from the embodiments of the invention described. For example, it is recognized that the steering diodes, e.g., 36 and 37, can be eliminated if the single Zener diode is replaced with back to back Zener diodes. In addition, any number of square wave generating circuits could be employed. For example, a pair of batteries of the desired voltage level could replace the entire Zener diode-capacitor or resistor-capacitor combination. Such deviations are intended to be within the spirit of the invention as encompassed by the appended claims.

What is claimed and desired to be secured by Letters Patent of the United States is:

1. In a phase controlled rectifier circuit in which the degree of conduction of each thyristor thereof is determined by the point of coincidence of a firing wave derived from the alternating voltage rectified by the thyristor and a variable firing command signal, a firing wave generator for generating an improved firing wave to insure coincidence between the command signal and the firing wave at a maximum degree of thyristor conduction, said firing wave generator comprising:

phase shift means responsive to said alternating voltage to derive a sinusoidal voltage lagging with respect to said alternating voltage;

firing wave limit means responsive to said alternating voltage to generate a square wave voltage which is leading 90° with respect to said sinusoidal voltage; and said sinusoidal voltage and square wave being additively combined by the firing wave generator to form a firing wave having a unipolarity voltage sinuous portion decreasing in magnitude as the degree of conduction of the associated thyristor increases and a square wave voltage at the maximum degree of thyristor conduction of lower or opposite polarity voltage than the sinuous portion.

2. A firing wave generator as recited in claim 1 wherein said phase shift means derives a sinusoidal voltage lagging 90° with respect to the alternating voltage.

3. A firing wave generator as recited in claim 1 wherein said firing wave limit means generates a square wave having a greater voltage magnitude than the peak voltage of said sinusoidal voltage.

4. A firing wave generator as recited in claim 1 further including means for deriving a current from said alternating voltage, said current being common to said phase shift means to form said sinusoidal voltage and said firing wave limit means to form said square wave.

5. A firing wave generator as recited in claim 4 wherein said firing wave limit means includes voltage level clamping means to obtain said square wave from the common current.

6. A firing wave generator as recited in claim 5 wherein said voltage level clamping means is a Zener diode and said firing wave generator includes unidirectional current conducting means to ensure that the common current is applied to said Zener diode in the same direction regardless of the polarity of said alternating voltage.

7. A firing wave generator as recited in claim 6 wherein said firing wave limit means further includes a pair of capacitors connected across the Zener diode, the interconnection point of the capacitors being connected to a circuit electrical common, said capacitors thereby ensuring even division of the Zener breakdown voltage to provide a symmetrical square wave.

8. A firing wave generator as recited in claim 7 wherein said phase controlled rectifier contains a plurality of thyristors and said firing wave generator includes a phase shift means and unidirectional current conducting means for each thyristor and a single common firing wave limit means.

9. A firing wave generator as recited in claim 4 wherein said firing wave limit means includes a resistor and a pair of capacitors connected across said resistor, the interconnection point of the capacitors being connected to the circuit electrical common, such that the voltage across the resistor is proportional to the average of said common current.

* * * * *